ADDRESS MANIPULATION CIRCUITRY FOR A DIGITAL COMPUTER

Filed Sept. 25, 1967

2 Sheets-Sheet 1

May 5, 1970 C. B. CARLSON ET AL 3,510,847

ADDRESS MANIPULATION CIRCUITRY FOR A DIGITAL COMPUTER

Filed Sept. 25, 1967 2 Sheets-Sheet 2

INVENTORS.
CARL B. CARLSON
BENJAMIN A. DENT
WILLIAM M. McKEEMAN
BY Christie, Parker & Hale
ATTORNEYS

United States Patent Office 3,510,847
Patented May 5, 1970

3,510,847

ADDRESS MANIPULATION CIRCUITRY FOR A DIGITAL COMPUTER

Carl B. Carlson, Arcadia, Benjamin A. Dent, Altadena, and William M. McKeeman, Palo Alto, Calif., assignors to Burroughs Corporation, Detroit, Mich., a corporation of Michigan Filed Sept. 25, 1967, Ser. No. 670,031
Int. Cl. G06f *9/20*
U.S. Cl. 340—172.5 15 Claims

ABSTRACT OF THE DISCLOSURE

A source of descriptors is provided that reference data and programs stored in a computer memory. The data and programs are stored in memory cells grouped in arrays. Each descriptor includes a first field designating the base address value of an array in the memory, a second field designating either the length value of the entire array (for an array descriptor) or the index value of a cell in the array from the base address value (for a cell descriptor) and a third field designating the nature of the second field, i.e., whether it is a length or an index value. When an instruction requiring access to the memory is received, the third field of the descriptor under consideration is inspected. If the third field designates that the second field contains an index value, the base address and index values of the descriptor are added together and the resulting absolute address is applied to the memory to access the cell denoted by the absolute address. If the third field designates that the second field contains a length value, an index value is retrieved from the source. This index value is substituted for the length value in the descriptor and the third field of the descriptor is modified to designate an index value in the second field. In essence, this converts the array descriptor to a cell descriptor. Thereupon, responsive to the same circuitry that develops the absolute address when the third field originally designates an index value in the second field, an absolute address is produced from the converted cell descriptor. Prior to converting the array descriptor to the cell descriptor in the latter case, the index value to be substituted in the array descriptor is compared with the length value of the array descriptor as a program check. If the length value is not larger than the index value, a program interrupt signal is generated.

BACKGROUND OF THE INVENTION

This invention relates to digital computers and, more particularly, to techniques for developing addresses to access the cells of a computer memory.

Descriptor words are commonly employed in digital computer operations to reference memory cells in the computer memory where data or program information is stored. In some computers, descriptors are also used to reference entire arrays or blocks of memory cells. The array descriptors include a field designating the address value of the cell at one boundary of the array, i.e. a base address, and a field designating the length of the array, i.e. the number of cells in the array, thereby completely defining the bounds of the array in the memory. Sometimes the descriptors have a common format that is capable of referencing either a cell within an array or the entire array. The format includes a field designating a length value and a field designating the address value of a cell. If a descriptor references a single cell in an array, this is indicated by setting the length value to zero, while the address value is the address of the cell referenced by the descriptor. If a descriptor references the entire array, the length field indicates the length of the array, i.e. the number of cells in the array, and the address field indicates the address of the cell at the lower boundary of the array, i.e. at the base of the array.

The transfer of the information in an array from the computer memory to an external memory unit, such as a disc file, to make room in the computer memory for other information is an operation sometimes called overlay. In connection with an overlay operation, the descriptors must be searched so the affected descriptors can be modified to reflect the absence of the overlaid information from the computer memory. The cell descriptors to be modified are determined by ascertaining if the address of each cell descriptor lies between the base address of the array and the base address of the array plus the array length. All cell descriptors with an address between these limits are modified. As part of this modification, it is necessary to compute the index value of the address field of each cell descriptor, i.e. the number of cells from the base of the array to the cell in question, because the information is, in general, stored in a new location upon its return to the computer memory. At that time, the same cell descriptors are again modified by adding the index to the base address of the new location to form the cell address. Thus, a great deal of address manipulation of the cell descriptors is necessitated by the overlay and return of information to the computer memory.

SUMMARY OF THE INVENTION

The invention is based upon the concept of fragmenting the address in the cell descriptors for a computer memory into two fields, namely a base address field denoting a reference cell within an array (preferably the cell at the lower boundary of the array), and an index field denoting the cell within the array relative to the base address. The format of the cell and array descriptors each includes a first field designating a base address value, a second field designating either an index value or a length value depending on the type of descriptor, and a third field designating the nature of the second field, namely an index or length value. Thus, the index and length values share the second field in different descriptors, namely cell and array descriptors, respectively, thereby making more efficient use of the available digit places in the descriptors. Since a base address value always appears in the first field of each cell descriptor, the cell descriptors to be modified on overlay can be detected by a direct comparison with the base value of the array in which the information to be overlaid is stored. Moreover, since an index value always appears in the second field of each cell descriptor, no computation of this index value is required each time the information the descriptor references is overlaid.

Specifically, on each occurrence of an instruction requiring access to the computer memory, the third field of the descriptor under consideration is inspected to determine the nature of the second field of the descriptor. If the third field designates an index value in the second field, the first and second fields of the descriptor are added to produce an absolute address that is applied to the memory to gain access to the cell denoted by the absolute address. If the third field designates a length value in the second field, the appropriate index value for the descriptor is retrieved and substituted for the length value in the second field. At the same time, the third field is modified to designate an index value in the second field. In essence, the array descripitor is converted to a cell descriptor. This converted cell descripitor is treated in the same way as an original cell descripitor. In other words, the third field is first inspected. Since it of necessity designates an index value, the first and second fields are then added to produce an absolute address that is applied to the memory.

A feature of the invention in connection with the conversion to a cell descriptor involves the comparison of the retrieved index value with the length value of the second field prior to substitution of the index value into the descriptor. If the comparison indicates that the index value equals or exceeds the length value, a program error has occurred so the execution of the computer instruction is interrupted.

BRIEF DESCRIPTION OF THE DRAWINGS

The features of a specific embodiment of the invention are illustrated in the drawings, in which.

DESCRIPTION OF A SPECIFIC EMBODIMENT

Figure 2:
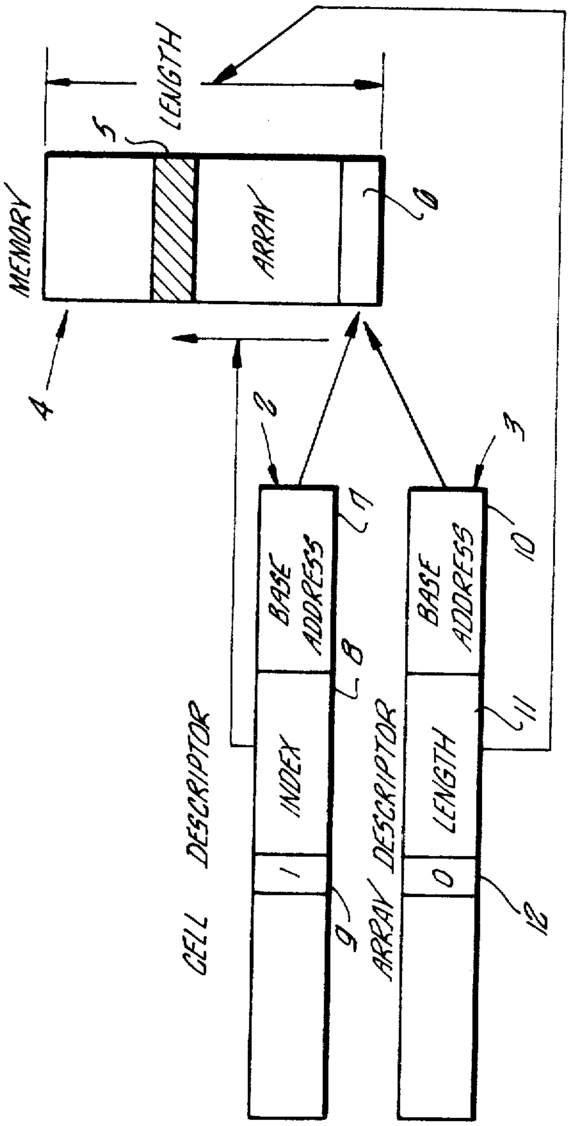
FIG. 2 is a schematic diagram illustrating the descriptor formats and addressing techniques employed in connection with the circuitry of FIG. 1.

Reference is now made to FIG. 2 in which descriptors of the type with which the invention is concerned and an array in a computer memory are depicted. For the purposes of visualization, the array is represented as a rectangular block 4 having cells such as 5 and 6 that extend across the width of the array and are located one on top of the other in the array to indicate that the cells within the array have successive memory addresses. A cell descriptor 2, which references cell 5 in the memory, includes a field 7 designating a base address value, a field 8 designating an index value, and a field 9 designating the nature of field 8. As illustrated in FIG. 2, the base address value of cell descriptor 2 is the memory address of cell 6, i.e. the cell at the lower boundary of array 4. Further, the index value of cell descriptor 2 equals the number of cells from cell 5 to cell 6. Accordingly, the absolute address of cell 5 in the memory is the sum of the base address value and the index value. Field 9 has a single identification digit place that is in the "1" state to designate that field 8 is an index value. An array descriptor 3, which references the entry array 4, includes a field 10 designating a base address value, a field 11 designating a length value, and a field 12 designating the nature of field 11. Fields 10, 11, and 12 occupy the same digit places in array descriptor 3 as fields 7, 8, and 9, respectively, occupy in cell descriptor 2. As illustrated in FIG. 2, the base address value of field 10 is the memory address of cell 6, i.e., the cell at the lower boundary of array 4, and the length value of field 11 equals the number of cells in array 4. Therefore, fields 10 and 11 define the bounds of the entire array. In this case, the identification digit place of field 12 is in the "0" state to designate that field 11 is a length value.

Figure 1:
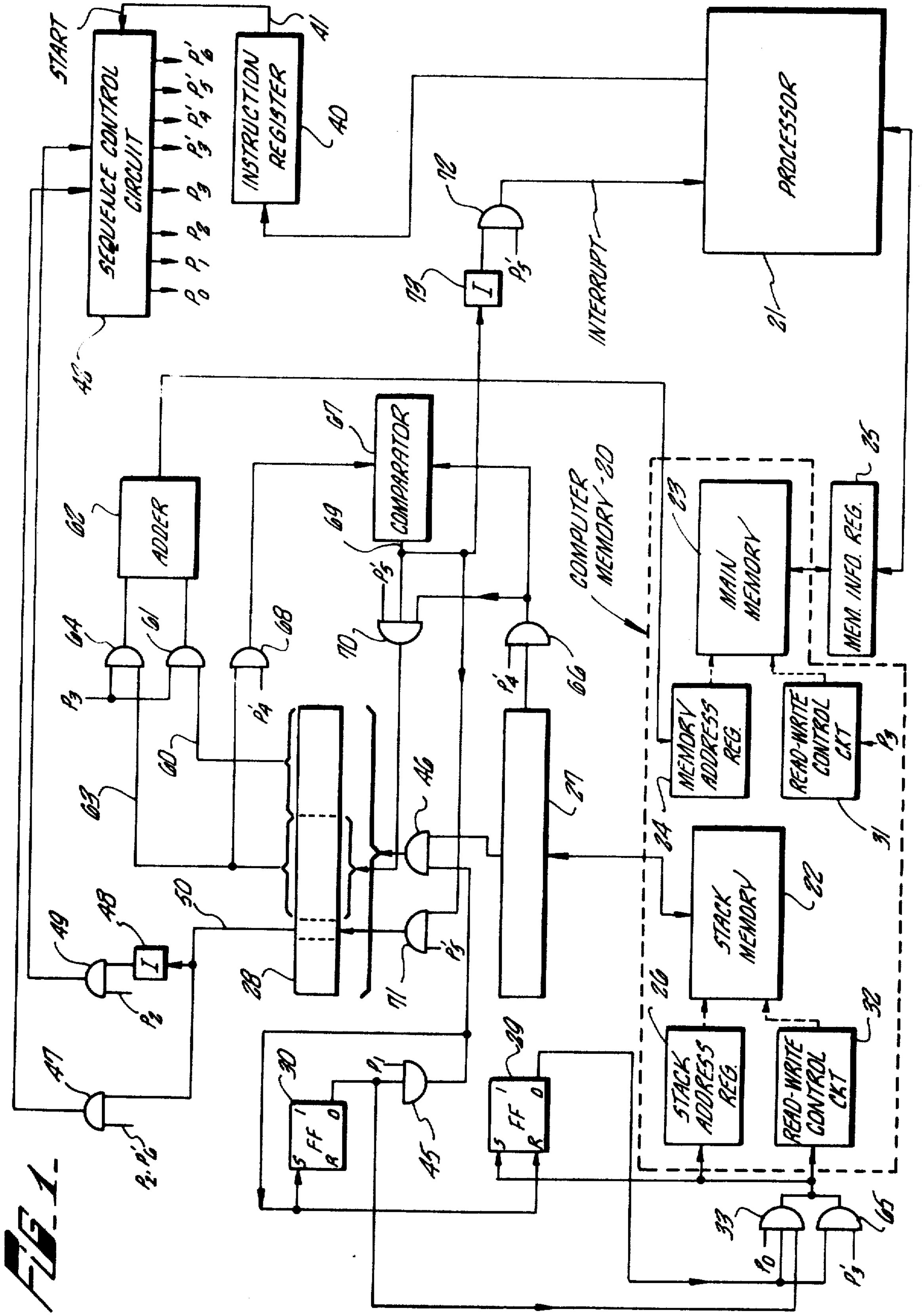
FIG. 1 is a block schematic diagram of address manipulation circuitry incorporating the principles of the invention.

In FIG. 1 circuitry is shown for addressing a computer memory responsive to the descriptors depicted in FIG. 2. This apparatus operates in conjunction with a digital computer having a computer memory 20 and a processor 21. A portion of computer memory 20 is assigned to serve as a temporary storage area for descriptors, operands, and other items of information utilized in the course of the operation of the computer. This temporary storage area is called a stack because items are stored and read out on a last-in first-out basis. In other words, items are always removed from the top of the stack. Although the stack is physically part of computer memory 20, it is represented separately in FIG. 1 as a stack memory 22, while the remainder of computer memory 20 is represented as a main memory 23. The descriptors in stack memory 22 reference cells and arrays in main memory 23. As used herein, the term "cell" means one or more digit places in the memory forming a character, word, etc., and the term "array" means a group of cells having consecutive addresses in the memory. To access a cell in main memory 23, a memory address designating the location of the cell in main memory 23 is applied to a memory address register 24. The exchange of information between the designated cell location in main memory 23 and processor 21 takes place through a memory information register 25 under the control of a read-write control circuit 31. A stack address register 26 indicates the address of the top of the stack of memory 22. Each time an item is read or removed from the stack, the address value in register 26 is decreased by one and each time an item is written or placed in the stack, the address value in register 26 is increased by one. Registers 27 and 28 are employed in conjunction with stack memory 22. The state of flip-flops 29 and 30 indicate whether registers 27 and 28, respectively, are occupied, i.e., contain information to be preserved. If flip-flop 29 or 30 is set so its "1" output is energized, then the respective register is occupied. If flip-flop 29 or 30 is reset so its "0" output is energized, then the respective register is not occupied.

In the course of the operation of the computer, instructions are transferred from processor 21 to an instruction register 40. When register 40 receives an instruction requiring access to main memory 23, for example a read or write operation, a start signal is generated that is coupled by a lead 41 to a sequence control circuit 42. Sequence control circuit 42 has a plurality of leads that are energized sequentially at intervals of time which may be determined by the master clock source of the computer.

On the appearance of the start signal on lead 41, lead $P_0$ is energized. Lead $P_0$ and the "0" outputs of flip-flops 29 and 30 are connected to the inputs of an AND gate 33 whose output is coupled to a read-write control circuit 32 for stack memory 22. If registers 27 and 28 are both unoccupied as lead $P_0$ is energized, the output of AND gate 33 is energized to actuate read-write control circuit 32. As a result, the descriptor at the top of stack memory 22 is transferred to register 27 and the value stored in register 26 is decreased by one. At the same time, flip-flop 29 is set to indicate that register 27 is occupied.

Next, lead $P_1$ is energized. Lead $P_1$ and the "0" output of flip-flop 30 are connected to the inputs of an AND gate 45. Thus, if register 28 is unoccupied as lead $P_1$ is energized, the entire descriptor in register 27 is transferred through an AND gate 46 to register 28, flip-flop 30 is set to indicate it is occupied, and flip-flop 29 is reset to indicate it is not occupied.

Next, lead $P_2$ is energized. The digit place in register 28 designating the nature of the descriptor, i.e., cell descriptor or array descriptor, is directly connected by a lead 50 to one input of an AND gate 47 and connected through an inverter 48 to one input of an AND gate 49. Lead $P_2$ is connected to the other inputs of AND gates 47 and 49. If the value in the identification digit place is "1" as lead $P_2$ is energized, lead 50 is energized so AND gate 47 initiates the operation in which lead $P_3$ is energized. If the value in the identification digit place is "0" as lead $P_2$ is energized, lead 50 is not energized so AND gate 49 initiates the sequence of operations in which leads $P_3'$, $P_4'$, $P_5'$, and $P_6'$ are energized in succession.

If lead $P_3$ is energized after lead $P_2$, a cell descriptor occupies register 28. When lead $P_3$ is energized therefore, the base address value of the cell descriptor is coupled by a lead 60 through an AND gate 61 to one input of an adder 62 and the index value of the cell descriptor is coupled by a lead 63 through an AND gate 64 to the other input of adder 62. Adder 62 produces an absolute address that identifies the location in main memory 23 to be accessed. This absolute address is coupled to memory address register 24 and information is exchanged between processor 21 and the addressed location of main memory 23.

If lead $P_3'$ is energized after lead $P_2$, an array descriptor occupies register 28. The items are arranged in stack memory 22 such that an operand including an index value always lies directly below such an array descriptor. Thus, upon the energization of lead $P_3'$, an AND gate 65 actuates read-write control circuit 32 to transfer the item at the top of stack memory 22 to register 27 if flip-flop 29 indicates register 27 is unoccupied.

Then lead $P_4'$ is energized. The index value is retrieved from register 27 and coupled through an AND gate 66 to one input of a comparator 67. At the same time, the length value of the array descriptor in register 28 is coupled through an AND gate 68 to the other input of comparator 67. Comparator 67 has an output lead 69 that is energized only if the length value coupled through AND gate 68 is larger than the index value coupled through AND gate 66.

Next, lead $P_5'$ is energized. Lead 69 of comparator 67 is directly coupled to one input of an AND gate 70 and coupled through an inverter 73 to one input of an AND gate 72. Upon the energization of lead $P_5'$, an interrupt signal is generated at the output of AND gate 72 if the index value retrieved from register 27 equals or exceeds the length value of the array descriptor in register 28. This signifies a programmatic error which should be corrected before the execution of the program is continued. The interrupt signal is coupled to processor 21 to stop the operation of the program. On the other hand, if the index value is smaller than the length value, it is coupled through AND gate 70 to the digit places in register 28 occupied by the length value, thereby replacing the length value in register 28. Lead 69 is also coupled to one input of an AND gate 71 whose output is connected to the identification digit place in register 28. As the index value is substituted for the length value, the value in the identification digit place is also changed to "1" responsive to the output of AND gate 71. At this point in the operation, the descriptor in register 28 is in essence converted to a cell descriptor.

Next, lead $P_6'$ is energized. Lead $P_6'$ is connected to one input of AND gate 47. Accordingly, the operation is initiated in which lead $P_3$ is energized since a value of "1" appears in the identification digit place of register 28.

As lead $P_3$ is energized, the previously described operation occurring responsive to the energization of lead $P_3$ takes place. In other words, the index address value and the base value in register 28 are added and the resulting absolute address is coupled to memory address register 24 to access the desired location in main memory 23.

In summary, the described circuitry determines whether a cell descriptor or an array descriptor occupies register 28 at the time of a computer instruction requiring access to the computer memory. If a cell descriptor occupies register 28, the base address value and the index value are added to produce the absolute address for application to memory address register 24. If an array descriptor occupies register 28, an index value is retrieved and compared with the length value in register 28. If the retrieved index value does not exceed the length value, it is substituted therefor in register 28 and the value in the identification digit place is changed to indicate a cell descriptor. Since a cell descriptor now occupies register 28, the same operation is performed as in the situation where a cell descriptor originally occupies register 28.

Instead of employing the address of the cell at the lower boundary of an array as the base address value, the address of the cell at the upper boundary of the array could be employed. In other words, the addition of the base address and index values is considered in this specification in the algebraic sense, rather than the arithmetic sense.

A copending application of Carl B. Carlson, William M. McKeeman and William C. Price, Ser. No. 670,304, entitled "Address Manipulation Circuitry for a Digital Computer," filed concurrently herewith and assigned to the assignee of this application, discloses and claims related circuitry including circuitry for modifying the appropriate descriptors on overlay and return of information to the computer memory.

What is claimed is:

1. In a digital computer, address manipulation circuitry comprising:
   an addressable memory;
   a source of descriptors referencing information stored in arrays in the memory, each descriptor including a first field designating the base address value of the array, a second field designating either the length value of the entire array or the index value of a cell in the array from the base address value, and a third field designating the nature of the second field;
   means responsive to the occurrance of an instruction to access the memory for inspecting the designation of the third field of the appropriate descriptor;
   means responsive to the designation by the third field of an index value in the second field for adding the first and second fields to produce an absolute address; and
   means for applying to the memory the absolute address produced by the adding means to access the memory location designated by the absolute address.

2. The circuitry of claim 1, in which means are responsive to the designation by the third field of a length value in the second field for retrieving an index value which is added to the first field to produce an absolute address that is applied to the memory.

3. The circuitry of claim 2, in which:
   means substitute the retrieved index value for the length value in the second field of the descriptor;
   means modify the third field of the descriptor to designate an index value in the second field; and
   the means for adding the first and second fields operates responsive to the modified designation by the third field to add the first and second fields and produce an absolute address.

4. The circuitry of claim 1, in which:
   means are responsive to the designation by the third field of a length value in the second field for retrieving an index value;
   means substitute the retrieved index value for the length value in the second field of the descriptor;
   means modify the third field of the descriptor to designate an index value in the second field; and
   the means for adding the first and second fields operates responsive to the modified designation by the third field to add the first and second fields and produce an absolute address.

5. The circuitry of claim 1, in which:
   means are responsive to the designation by the third field of a length value in the second field for retrieving an index value for the descriptor;
   means compare the retrieved index value with the length value in the second field of the descriptor; and
   means add the index value to the first field to produce an absolute address if the comparison indicates the index value is smaller than the length value.

6. The circuitry of claim 5, in which means interrupt the execution of the computer instruction to access the memory if the comparison indicates the index value exceeds the length value.

7. Address manipulation circuitry for a digital computer comprising:
   an addressable memory;
   a source of cell descriptors referencing particular cells in the memory and array descriptors referencing entire arrays in the memory,
   each cell descriptor including a first field designating the base address value of the array in which the cell is located, a second field designating the index value of the cell from the base address, and an identification digit place of a first value denoting a cell descriptor,
   each array descriptor including a first field designating the base address value of the array, a second field designating the length value of the array, and an identification digit place of a second value denoting an array descriptor;

means for coupling a descriptor to the register;

means responsive to an actuating signal for determining the type of descriptor in the register;

means responsive to the determination of a cell descriptor for combining the base address value and the index value to produce an absolute address for accessing the computer memory;

means responsive to the determination of an array descriptor for replacing the length value with an index value and changing the identification digit place in the register to the first value to convert the array descriptor to an item descriptor; and means responsive to the formation of the converted cell descriptor for generating the actuating signal, thereby determining the type of descriptor and combining the base address and the index values.

8. The circuitry of claim 7, in which means compare the index value with the length value prior to replacing it and the replacing means operates only if the index value is smaller than the length value.

9. The circuitry of claim 8, in which means generate a program interrupt signal if the index value equals or exceeds the length value.

10. In a computer having a memory, address manipulation means for the memory comprising:

means for providing information signals including in series a descriptor and a first index value, the descriptor having a first field designating a base address and a second field designating either a length value or a second index value;

means for selectively replacing the length value in a descriptor with the first index value thereby forming a modified descriptor identifying a particular memory location; and means responsive to the first and second descriptor fields for addressing the memory for reading or writing.

11. In a computer having a memory, address manipulation means for the memory comprising:

first and second register means for storing a descriptor and a first index value, respectively, the descriptor having a first field designating a base address and a second field designating either a length value or a second index value;

means for selectively replacing the length value in a descriptor in the first register with the first index value in the second register, thereby forming a modified descriptor identifying a particular memory location; and means responsive to the modified descriptor in the first register means for addressing the memory for reading or writing.

12. The computer of claim 11, in which the descriptor stored in the first register means also has a third field designating the nature of the second field and the replacing means operates responsive to the designation of a length value by the third descriptor field.

13. In a computer having a memory, address manipulating means for the memory comprising:

means for providing information signals including, in series, a descriptor and a first index value, the descriptor having a first field designating a base address and a second field designating either a length value or a second index value;

means operative in the presence of a length value in a descriptor for selectively comparing the length value with the first index value and upon detecting a predetermined correspondence causing the first index value to be placed in the second field of the descriptor; and means responsive to the first and second descriptor fields for addressing the memory for reading or writing.

14. In a computer having a memory, address manipulating means for the memory comprising:

first and second registers for storing a descriptor and a first index value, respectively, the descriptor having a first field designating a base address and a second field designating either a length value or a second index value;

first means operative in the presence of a length value in a descriptor for selectively comparing the same with the first index value and upon detecting a predetermined correspondence causing the first index value to be placed in the first register in the second field of the descriptor; and second means responsive to the first and second descriptor fields the first register for addressing the memory for reading or writing.

15. The computer of claim 14, in which the first means causes the first index value to be placed in the first register upon detecting that the length value is larger than the index value.

References Cited

UNITED STATES PATENTS

| | | | |
|---|---|---|---|
| 3,303,477 | 2/1967 | Voigt | 340—172.5 |
| 3,386,084 | 5/1968 | Nelson | 340—172.5 |
| 3,389,380 | 6/1968 | Ashbaugh et al. | 340—172.5 |

RAULFE B. ZACHE, Primary Examiner